No. 636,685. Patented Nov. 7, 1899.
E. McGARVEY.
WEIGHT AND PRESSURE RECORDING APPARATUS.
(Application filed Jan. 12, 1899.)

(No Model.) 4 Sheets—Sheet 1.

WITNESSES:

INVENTOR
Edward McGarvey
BY
ATTORNEYS.

No. 636,685. Patented Nov. 7, 1899.
E. McGARVEY.
WEIGHT AND PRESSURE RECORDING APPARATUS.
(Application filed Jan. 12, 1899.)
(No Model.) 4 Sheets—Sheet 2.

WITNESSES:
Donn Twitchell
C. R. Ferguson

INVENTOR
Edward McGarvey
BY
ATTORNEYS.

No. 636,685. Patented Nov. 7, 1899.
E. McGARVEY.
WEIGHT AND PRESSURE RECORDING APPARATUS.
(Application filed Jan. 12, 1899.)
(No Model.) 4 Sheets—Sheet 3.
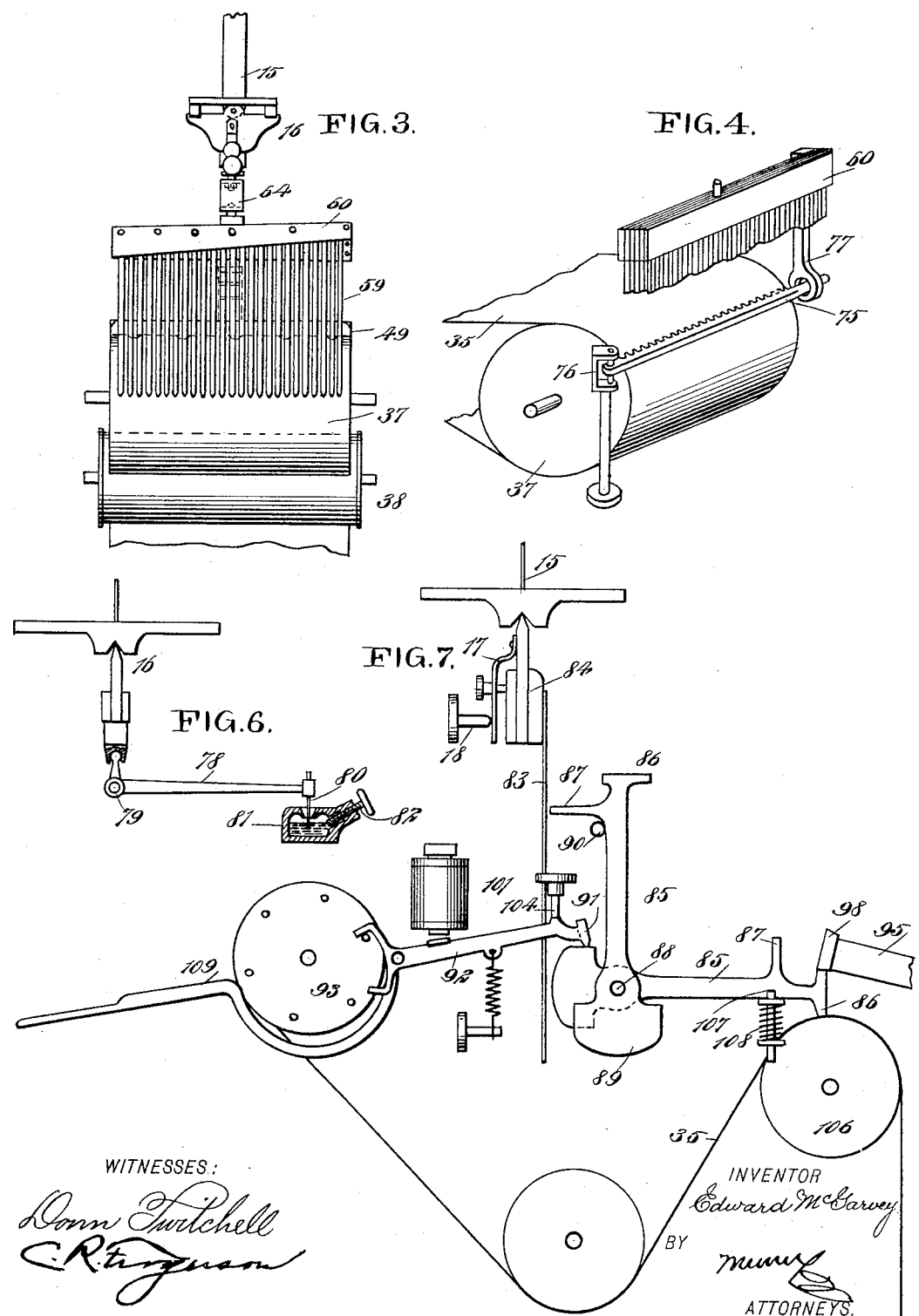
WITNESSES:
Donn Twitchell
C. R. Ferguson
INVENTOR
Edward McGarvey
BY
ATTORNEYS.

No. 636,685. Patented Nov. 7, 1899.
E. McGARVEY.
WEIGHT AND PRESSURE RECORDING APPARATUS.
(Application filed Jan. 12, 1899.)
(No Model.) 4 Sheets—Sheet 4.
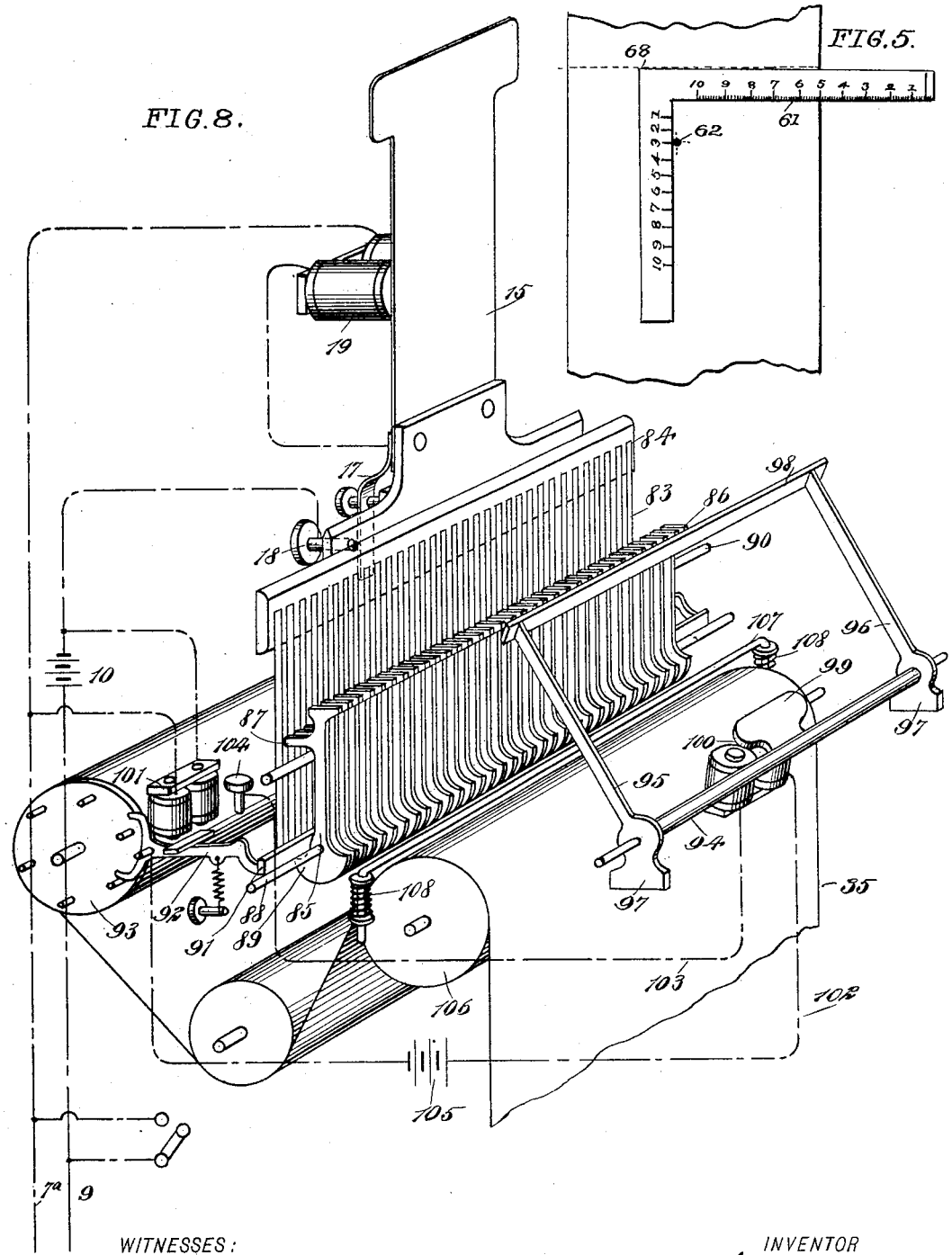
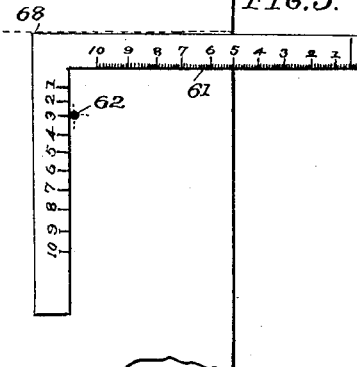
WITNESSES:
INVENTOR
Edward McGarvey
BY
ATTORNEYS.

UNITED STATES PATENT OFFICE.

EDWARD McGARVEY, OF BELLEFONTE, PENNSYLVANIA, ASSIGNOR OF ONE-HALF TO GUY C. LINN, OF SAME PLACE.

WEIGHT AND PRESSURE RECORDING APPARATUS.

SPECIFICATION forming part of Letters Patent No. 636,685, dated November 7, 1899.

Application filed January 12, 1899. Serial No. 701,913. (No model.)

*To all whom it may concern:*

Be it known that I, EDWARD McGARVEY, of Bellefonte, in the county of Centre and State of Pennsylvania, have invented a new and Improved Weight and Pressure Recording Apparatus, of which the following is a full, clear, and exact description.

This invention relates to devices for recording weight or pressure; and the object is to provide a simple electrically-controlled apparatus by means of which the weight of objects or pressure of the same—such, for instance, as railway-cars and their contents or the strength of an electric current or the like—may be accurately recorded at any point near to or distant from the weighing-scale and by means of which the time and trouble of manipulating weights and poises are avoided.

I will describe a weight and pressure recording apparatus embodying my invention and then point out the novel features in the appended claims.

Reference is to be had to the accompanying drawings, forming a part of this specification, in which similar characters of reference indicate corresponding parts in all the figures.

Figure 1:
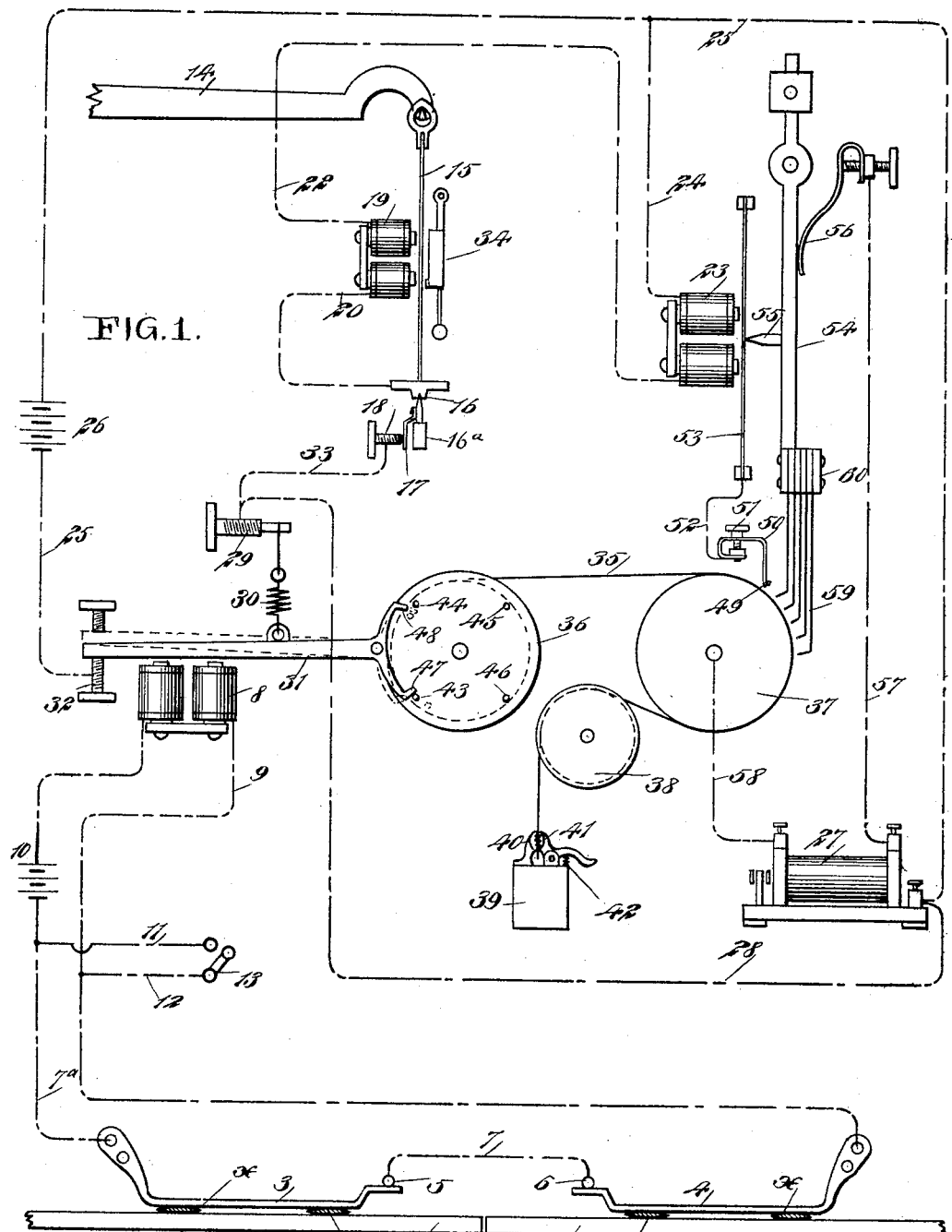
Figure 2:
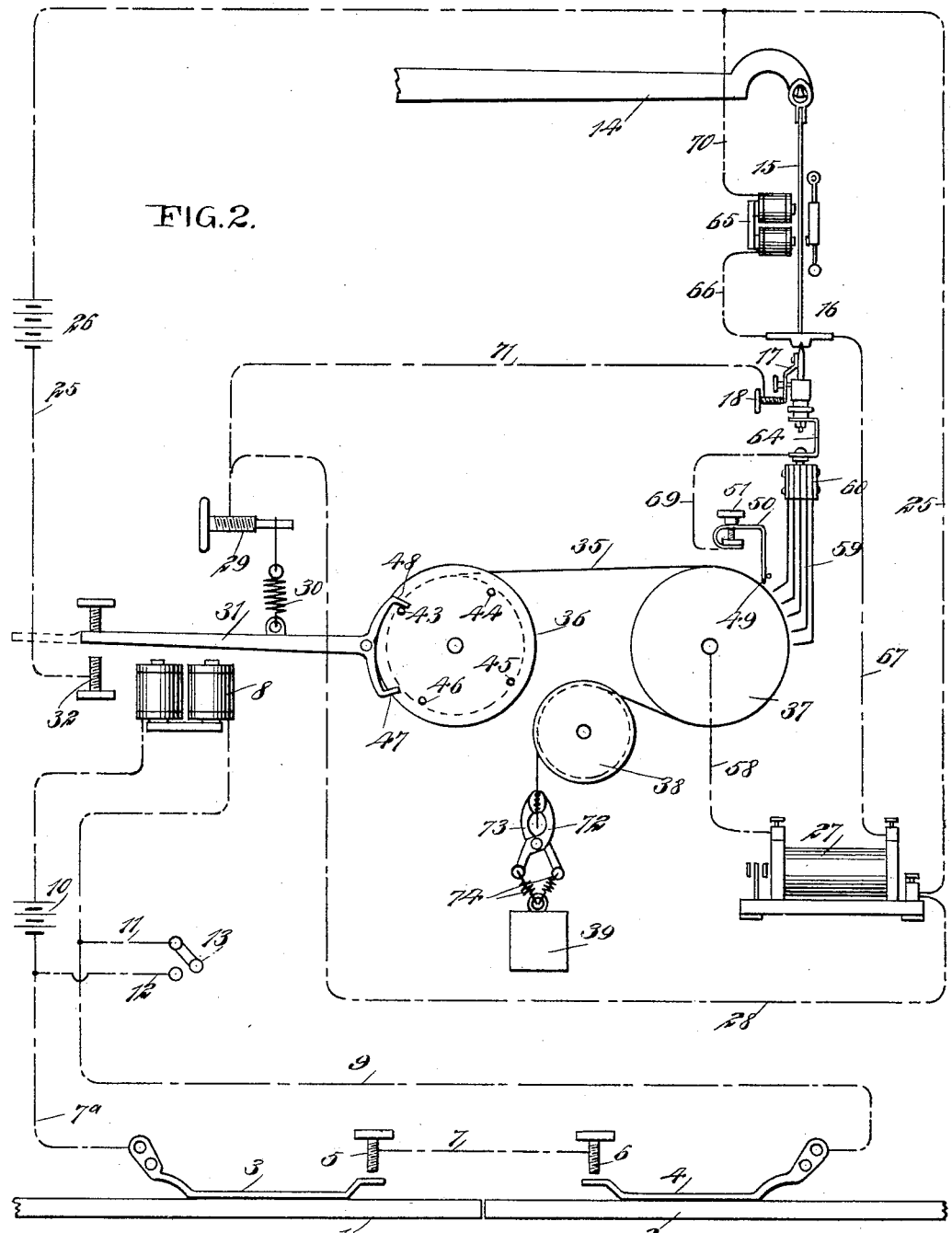

Figure 1 is a diagrammatic view of a weight and pressure recording apparatus embodying my invention. Fig. 2 is diagrammatic view showing a modification. Fig. 3 is a front view of the recording portion of the device shown in Fig. 2. Fig. 4 is a perspective view of a portion of the recording device of a further-modified construction. Fig. 5 shows a portion of a record-strip and indicating-rule employed. Fig. 6 is a detail showing a modification that may be employed where there is a great range of pressure and corresponding range of vibration. Fig. 7 is an end view of a modified form of the recorder. Fig. 8 is a perspective view thereof.

In Figs. 1 and 2 I have indicated the apparatus as in connection with a scale for weighing railway-cars and their contents, each car being weighed independently, and in which the weight is recorded automatically for each car of a train.

Referring to Fig. 1, 1 and 2 designate track-sections designed to be placed upon the platform of a weighing-scale. At the sides of the sections 1 2 are arranged, respectively, contact-springs 3 4, which serve to close a circuit through the contacts 5 6, connected by the wire 7. The ends of the spring-contacts 3 4 are normally out of engagement with the contacts 5 6; but when a car is moved upon a platform the flanges of the truck-wheels, as indicated at $x$, passing between the rail-sections and the spring-contacts, will force the inner or adjacent ends of said contacts outward into engagement with the contact-points 5 6, as indicated in Fig. 1.

From the circuit-closer or spring-contact 3 a wire $7^a$ extends to one pole of an electromagnet 8, and from the other pole of this electromagnet a wire 9 extends to a connection with the other circuit-closer or spring-contact 4, and arranged within this circuit is a battery 10. From the wires 7 and 9 shunt-wires 11 and 12 extend, and the circuit is designed to be opened and closed in these shunt-wires by means of a switch 13 for the purpose of cutting in or out the rail-contacts.

Having connection with the scale-platform upon which the track-sections are mounted, and in the usual manner, is a scale-beam 14, and attached to the free end of the scale-beam is a vibrating ribbon 15, consisting of a thin metal—such, for instance, as steel. The lower end of this ribbon is rigidly connected to an interrupter-carrying plate $16^a$, having knife-edge bearings in lugs on the lower side of an anchor-plate 16. On one side of the plate $16^a$ is a spring-finger 17, adapted to make and break connection with an adjustable portion of the interrupter, here shown as a screw 18. When vibratory motion is given to the plate $16^a$ by the ribbon, it is obvious that the current will be interrupted between the parts 17 and 18.

Arranged at one side of the ribbon 15 is an electromagnet 19, from one pole of which a wire 20 extends to a connection with the hanger 16, and from the other pole of this electromagnet 19 a wire 22 extends to one pole of an electromagnet 23, designed to operate a recording mechanism, as will be hereinafter described. From the other pole of the electromagnet 23 a shunt-wire 24 connects with a main wire 25. The wire 25 extends from a battery 26 and connects with the primary of an induction-coil 27, and from this primary a wire 28 extends to an adjusting-screw 29, having a spring connection 30 with a lever 31, which forms an armature for the electromagnet 8 and operates by a step-by-step motion a recording strip of chemically-prepared paper, to be hereinafter described. The other end of the wire 25 is connected to a contact-screw 32, designed to be engaged by the armature-lever 31, and the adjusting-screw 29 has a wire connection 33 with the portion 18 of the interrupter.

It is designed that a vibratory motion, as before stated, shall be imparted to the ribbon 15 by the current passing through the electromagnet 19, and as at times the said vibration may not begin as quickly as desired I may employ a starting device therefor, here shown as consisting of a swinging armature 34, adapted to be drawn against the ribbon by the electromagnet 19—that is, when the magnet 19 is energized—and should the ribbon not immediately start, the non-magnetic lug on the armature 34 will be drawn against the ribbon, thus inducing it to start, after which the starter will pull back to its normal position, because it will only respond to a steady attraction, and the magnet becomes intermittent immediately upon the starting of the ribbon. It may be here stated that while under weighing pressure a vertical movement of the scale-beam 14 will be scarcely perceptible. The weight on the scale, however, will cause a varying tension on the ribbon.

As before stated, the operation of the lever 31 is designed to permit a step-by-step motion to a strip of prepared paper upon which the record is to be made by perforating devices. This strip of paper 35 extends from a feed-roller 36 over an impression-roller 37 of electric conducting material and thence over a roller 38, and in order to cause a feed of the recording-strip I have here shown a weight 39 as attached to the end of the strip. The weight 39 is provided with a fixed jaw 40 and with a spring-pressed jaw 41, and the spring 42, governing the spring-pressed jaw, will prevent the breaking of the strip by yielding under sudden stoppage of the strip in its motion. On one end of the roller 36 is a series of pins 43, 44, 45, and 46, adapted to be engaged consecutively by the escape of the fingers 47 48 on the lever 31.

A toothed plate 49 is held yieldingly near the strip of paper 35 on the roller 37 by means of a spring-plate 50, the tension of which may be adjusted by a screw 51. This spring-plate 50 has a wire connection 52 with a disk or diaphragm 53 under the control of the electromagnet 23. A swinging arm 54 is arranged in front of the disk or diaphragm 53 and has a point 55 normally engaging with the center of said disk or diaphragm. The point is held yieldingly in such engagement by means of a spring 56, which bears against the arm 54. The arm 54 is in electric contact or connection with one pole of the secondary in the induction-coil 27 through the spring 56 and a wire 57, the other pole of said secondary being in electrical connection with the roller or cylinder 37 through the wire 58.

Supported by the arm 54 is a number of reeds 59. These reeds consist of thin steel and are made of varying length and thickness to give each one a different natural rate of vibration. The reeds are arranged in the form of a brush, herein shown as in five lines, and suspended from a cross-head 60, attached to the end of the arm 54. The free ends of the reeds 59 are platinum-pointed and are turned inward or toward the cylinder or roller 37 at a short distance from the paper on the same. It will be seen that these reeds are in the electric circuit extending through the secondary of the coil 27. While I have described the reeds of each row as being of different lengths, it is to be understood that the lower ends of the reeds in a row must be on the same plane, the variation in length being provided for at the connection with the cross-heads 60, as indicated in Fig. 3, and it will be noted that the marking-plate 49 is slightly above the paper strip and above the free ends of the reeds 59.

In operation of the device so far described, when a car is resting on the rail-sections 1 and 2 and the circuit is closed by means of the contacts 3 and 4, the current from the battery 10 passes through the electromagnet 8, the wire 9, the parts 4, 7, and 3, and back to the battery through wire $7^a$. When this takes place, the lever 31 is attracted by the electromagnet 8 until it rests on the screw 32. This closes the circuit of the battery 26 through the wire 25, primary of the induction-coil 27, wire 28, screw 29, spring 30, and lever 31, the screw 32, and back to the battery 26. A portion of this current flows through the wire 25, the shunt 24, magnet 23, the wire 22, magnet 19, the wire 20, the hanger 16, the interrupter, the wire 33, the parts 29 30, and the armature back to the battery. The secondary current carried from the induction-coil passes through the wire 57, the spring 56, the arm 54, the disk or diaphragm 53, to the marking-plate 49, through the recording-strip, the cylinder 37, and wire 58 to the secondary coil 27. The strain exerted upon the ribbon 15 will impart to it a vibration, which will also vibrate the hanger 16 and operate the interrupter, to make and break the electric current through the parts heretofore described to the reeds 59 and also to the plate 49 and prepared paper 35, and the plate will mark the datum of the record by sparking between the points of said plate and its cylinder 37. This sparking will burn perforations 61 in a straight line across the record-strip, as indicated in Fig. 5.

As the electromagnet 23 is in the same circuit with the electromagnet 19, the disk or diaphragm 53 will be operated in unison with the ribbon 15, which is operated or controlled by the electromagnet 19, and this operation of the parts will cause the reed 59, which may be in accord or in tune with the vibration of the disk or diaphragm 53, to pulsate or swing into sparking distance of the record-strip 35, so that the spark-current will pass through said strip and the roller 37 to the coil 27. This passing of the current from the reed will burn a perforation 62 through the record-strip, as indicated in Fig. 5.

To ascertain the weight indicated on the strip, I employ a gage, here shown in the form of a square 63. This square has its longer member so numbered and spaced as to coincide with the number of reeds in a single row. It should be remarked here that the reeds in each row should be equally numbered and equally spaced. The difference between each reed and its neighbor in the same row is equal to a corresponding difference of one hundred pounds on the scale. The divisions marked on the shorter arm of the square, which are spaced to coincide with the rows of reeds, will each denote a difference of one hundred pounds in weight. This is assuming that the machine has five rows of reeds, with one hundred reeds in each row. After the recording-puncture has been made in the paper the upper edge of the longer member of the square is to be placed against the datum-line and the inner edge of its shorter arm on the perforation. This will denote the number and the row of reeds, and consequently the number of one-thousand-pound marks. In this case, as shown in Fig. 5, the scale indicates "3" on the shorter arm, or three thousand pounds, while the marks of graduations on the longer arm, which fall on the edge of the record-paper at the right-hand side, will denote the number of spaces between the perforation and left edge of the paper record-strip. In this case "5" is shown, corresponding to five hundred pounds, making a total of three thousand five hundred pounds. The perforation is indicated in Fig. 5 by 62. When the weight is removed from the scale, the circuit through the electromagnet 8 will be broken, allowing the spring 30 to draw the armature-lever 31 upward to the position indicated by dotted lines in Fig. 1. This movement of the lever will cause the escapement-finger 47 to release the pin 43, so that through the influence of the weight 39 the strip 35 will be drawn forward a sufficient distance for another blank space to be operated upon, this of course being controlled by the distance between the pins on the roller 36. In other words, the roller will continue to rotate until the pin 43 engages with the inner side of the finger 48. At this time the pin 46 will be in the position indicated at the right of the pin 43, so that when the electromagnet has again been energized and the lever 31 is consequently drawn downward or to it the pin engaged by the finger 48 will be released, and then there may be a slight radial movement of the roller 36 until the pin 46 engages against the outer side of the finger 47. Then the weighing operation is carried out, as before stated. When other articles than cars are to be weighed on the scale, the current must be closed through the wires 7ª and 9 by closing the switch 13.

The device above described is intended for use when the recording instrument is at a distance from the weighing-scale. In Fig. 2 the device is arranged to be placed near the recording-scale. In the device shown in Fig. 2 the operation is substantially the same as that described for Fig. 1. In this instance, however, the reeds are connected directly to the hanger of the ribbon 15.

The cross-head 60, supporting the reeds 59, is connected by a yoke 64 to a stem portion of the hanger 16. In this instance the electromagnet 65 has a shunt-wire 66 extended to the hanger 16, and from the hanger a wire 67 extends to the coil 27. From the yoke 64 a wire 69 forms a connection with the spring 50, a wire 70 extends from the electromagnet 65 to the main wire 25, and the screw 18 is in electrical connection with the screw 29 by means of a wire 71.

In the operation of this device the engagement of the armature 31 with the contact 32 causes the current to flow from the battery 26 through the wires 25 70, magnet 65, wire 66, hanger 16, the interrupter, wire 71, screw 29, lever 31, and back to the battery, and a portion flows from wire 25 to the primary of coil 27, wire 28, and back to the battery.

If any one of the reeds 59 has sufficient swing to nearly touch the paper on the cylinder 37, this swing being caused to be in unison with the vibration of the ribbon 15 and controlled by the electromagnet 65, a perforation will be burned through the recording-strip, as before described. The weight 39 in this example of my improvement is suspended from the record-strip 35 by means of two spring-jaws 72 73, the arms of which are connected to the weight by means of spring 74 for the purpose before described.

Where it is desired that the marking-plate shall produce a line of spark-perforations across the record-strip, it may be arranged as shown in Fig. 4. In this figure the reeds are cut away to plainly show the marking-plate 75, having saw-teeth which engage with the paper strip. This plate is pivoted at one end to a frame 76, and at its other end it is loosely engaged with an arm 77, depending from the cross-head 60.

While the reeds are quiet, the marker 75 will remain parallel with the cylinder 37; but when the reeds vibrate, the marker will swing back and forth and the spark will pass from the nearest point to the cylinder, and the perforations will be distributed in a line across the record paper or strip. In cases where the vibrator is to work across a great range of pressure and the corresponding change in weight and amplitude of vibration in the ribbon interferes with the adjustment of the contact the interrupter shown in Fig. 6 may be used instead of the interrupter consisting of the parts 17 and 18. In this view, Fig. 6, an angle-lever 78 is pivoted at 79, and its upwardly-extending portion has a swinging connection with the hanger 16.

On the end of the horizontal portion or longer arm of the lever is a platinum point 80, which projects into a mercury-cup 81. The height of the mercury in the cup may be regulated by a screw 82 passing through a tapped hole in the side of the cup and adapted to engage with the mercury and lift it, when required, by displacement. The mercury may have a layer of oil on top to prevent the formation of oxid or to prevent evaporation. The contact through the mercury is made by attaching the wire to the screw 82. It will be seen that as the hanger vibrates back and forth the long arm of the lever will rise and fall, thus making and breaking the circuit.

In the modification shown in Figs. 7 and 8 the reeds 83 are arranged in a single row upon a cross-head 84, suspended from the ribbon 15, and in front of each reed 83 is a perforator consisting of a metal plate 85, having at its upper outer end a perforating-point 86 and having at its inner side a finger 87, which nearly touches the reed. All the perforators are mounted to swing on a rod 88, extended through the lower ends of said perforators, and these lower ends are counterbalanced, as at 89, for the purpose of holding the perforators yieldingly in their vertical position and also for returning them to their vertical position. A rod 90 is arranged between the perforators and the reeds and is designed to be engaged by the perforators when in their vertical position to prevent them from contact with the reeds until the reeds shall have been vibrated, as will be hereinafter described.

Extended between the reeds and perforators, near the lower end, is a bar 91, which at one end is connected to an escape-lever 92, adapted to operate a feed-cylinder 93, in the manner described in connection with the first example of my improvement. While the machine is not in use the bar 91 rests upon the upper inner sides of the weighted lower ends 89 of the perforators.

In front of the perforators and extending across the full length of the same is a rock-shaft 94, from the ends of which arms 95 96 are extended. These arms are counterbalanced at the lower ends, as at 97, and attached to their other ends is a striker-bar 98. Attached to the center of the rock-shaft 94 is an armature 99, coacting with an electromagnet 100. The armature-lever 92 coacts with an electromagnet 101, which has wire connections with the main wires 7ª and 9. One of the main wires connects with the electromagnet 19, and this electromagnet 19 has connection with the interrupter-section 17, which coacts with the interrupter-section 18, connecting with the other main wire. From one pole of the electromagnet 100 a wire 102 extends to a connection with the armature-lever 92, and from the other pole of said electromagnet a wire 103 extends to a connection with a contact-screw 104, adapted to be engaged by the armature-lever to close a circuit through the wires 102 103, in which circuit is arranged a battery 105. The record-strip 35 in this example extends over a roller 106, and arranged over the roller is a buffer-rod 107. This buffer-rod is supported at its ends on springs 108 and is designed to slightly lift the perforators after they shall have made a perforation through the record-strip, as will be hereinafter described.

When the load is on the scale, the circuit is closed through the electromagnet 101, and this lifts the armature-lever 92 into engagement with the contact 104. This movement of the armature-lever of course lifts the bar 91 out of engagement with the perforators, which remain lightly touching the bar 90. The lever 92, coming in contact with the screw 104, closes the circuit through the electromagnet 100, which operates to draw the armature 99 downward, and consequently to move the striker-bar 98 downward; but before the striker-bar can complete its movement the ribbon-vibrator 15 will have started some one of the reeds 83, and this reed in vibrating will strike the arm 87 of the perforator in front of it, causing said perforator to fall, with its point 86 resting on the record-strip. Then the striker 98, in obedience to the armature of the electromagnet 100, strikes the perforator and drives its point through the paper, making a record. At this time the parts described have the position shown in Fig. 7. When the current is shut off, the parts all take their initial position again. The perforator is restored to its vertical position by the bar 91 falling upon the upper sides of its lower weighted end, and the striker-bar 98 is moved to its initial position by the counterweights 97. When the perforator is first in its downward position, it will rest upon the buffer-rod 107 and remain until the striker-bar engages with it and drives its point through the paper. Then upon the striker-bar moving upward the buffer-rod will raise the perforator out of the paper.

As in the first instance the escapement on the armature-lever 90 serves as a retarding device for the feed of the record-strip, and, if it is desired at any time, this armature-lever and escapement may be operated manually by moving a handle 109.

Some of the advantages of the recorder are: First, the weight is taken without perceptible movement of the scale-beam, thus causing very little or no wear on the parts and simplifying the construction of the scale; second, it gives a permanent record of the weight, thus doing away with the liability of mistakes by wear of the parts; third, it will make a record and take the weight in less time than is possible with the ordinary scale having shifting weights or poises; fourth, it makes it possible for one man to take the gross and net weight, with the number of each car, in a train running over the scale; fifth, the recording apparatus need not be by the scale, but may be in an office at a distance, and, further, in addition to taking a record of the weight at one point, another separate recorder can be in the same circuit, but at a distance—say in the central office—where an additional weight can be verified.

Having thus fully described my invention, I claim as new and desire to secure by Letters Patent—

1. In a weight and pressure recording apparatus a weight and pressure device, a record-strip, a vibrator controlled by an electric circuit the said circuit being controlled by the weight or pressure device, and devices for causing perforations through the record-strip, the said devices being controlled by the vibrator, substantially as specified.

2. A weight and pressure recording apparatus, comprising a weight and pressure device, a vibrator, an electric circuit for controlling the vibrator, a movable record-strip, a series of reeds supported by the vibrator, each reed being adapted to respond to a different vibratory action of the vibrator and thus vibrate in unison with the vibrator, and operating to cause a perforation to be made in the record-strip, substantially as specified.

3. A weight and pressure recording apparatus, comprising a record-strip, a vibrator, an electric circuit for controlling the vibrator, the electric circuit being controlled by the object to be weighed, a series of reeds of varying lengths, each reed being adapted to a different vibratory action of the vibrator and thus vibrate in unison with the vibrator, the lower ends of said reeds being adjacent to the record-strip and in an electric circuit with a cylinder over which the record-strip moves, and a perforating-plate extending across the record-strip and in electric circuit with the vibrator, substantially as specified.

4. A weight and pressure recording apparatus, comprising a record-strip, a metal roller over which the strip moves, a supply-roller for the strip, an electric circuit controlled by the article or device to be weighed, an armature carrying an escapement for controlling the rotation of the record-strip supply-roller, a vibrator, an electromagnet at one side of the vibrator and in an electric circuit controlled by the armature, a series of reeds each adapted to respond to a different vibratory action of the vibrator and thus vibrate in unison with the vibrator, the lower ends of the reeds being adjacent to the record-strip over the metal roller, an electric circuit in which said roller and reeds are located, and a perforating-plate extended across the record-strip on the metal roller and in electric connection with the vibrator, substantially as specified.

5. In a weight and pressure recording apparatus, a record-strip, rollers over which said record-strip moves, an armature-lever for controlling the movements of the rollers, an electromagnet for operating said armature-lever in one direction, circuit-closers for controlling the current through said electromagnet, a scale-beam, a vibrating ribbon attached to the free end of said beam, a device to which the lower end of the ribbon is attached, an electromagnet on one side of said ribbon, a series of reeds mounted on a swinging arm and having their free ends adjacent to the record-strip, a disk or diaphragm for imparting motion to the reeds, an electromagnet for controlling said disk or diaphragm, and an induction-coil with the primary of which the two electromagnets are in electrical connection and with the secondary of which the reeds and diaphragm and roller adjacent to the reeds are in connection, substantially as described.

6. In a weight and pressure recording apparatus, a recording-strip, rollers over which said recording-strip moves, an armature-lever carrying an escapement for controlling the movements of the rollers, an electromagnet for operating said armature-lever in one direction, circuit-closers for controlling the current through said electromagnet, the said circuit-closers being operated by the wheels of a car or the like, a scale-beam, a vibrating ribbon attached to the free end of said beam, a hanger to which the lower end of the ribbon is attached, an electromagnet on one side of said ribbon, a series of reeds mounted on a swinging arm and having their free ends adjacent to the record-strip, a disk or diaphragm for imparting motion to the reeds, an electromagnet for controlling said disk or diaphragm, an induction-coil, with the primary of which the two electromagnets are in electrical connection and with the secondary of which the reeds and diaphragm and roller adjacent to the reeds are in connection, a perforating device extended over the record-strip, and an electrical connection between said device and the diaphragm, substantially as described.

7. In a weight and pressure recording apparatus, a vibrator, an electric circuit for operating said vibrator, means for closing said circuit, a record-strip, a metal roller over which said strip passes, a series of reeds controlled by the vibrator and having their free ends adjacent to the strip passing over the roller, a diaphragm for imparting motion to the reeds and an electric circuit in which the reeds and roller are located, the said reeds being adapted upon touching the paper strip to burn a perforation through the same by the electric spark, substantially as specified.

8. A weight and pressure recording apparatus, a recording-strip, rollers over which said strip extends, one of said rollers being a conductor of electricity, a series of vibrating reeds having their free ends adjacent to the record-strip passing over said conducting-roller, an electric circuit in which the reeds and the roller are arranged, a vibrator for controlling impulses through said circuit, an electromagnet for controlling said vibrator, the circuit of said electromagnet being under the control of the article to be weighed, substantially as specified.

9. In a weight and pressure recording apparatus, a movable record-strip, a metal roller over which said strip passes, a series of vibrating reeds having their free ends adjacent to the paper extending over said roller, an electric circuit in which said reeds and the roller are arranged, a vibrator for controlling said reeds, an electric circuit in which the vibrator is arranged, an electrically-controlled perforating-plate arranged over the paper, an electromagnet for controlling the vibrator, an electric circuit in which said electromagnet is arranged, an armature-lever for controlling the movement of the record-strip, and also for controlling the last-named circuit, an electromagnet for said armature, an electric circuit for said electromagnet, and circuit-closers comprising spring-arms arranged adjacent to a railway-track and designed to be operated by the wheels of a car, substantially as specified.

10. In a weight and pressure recording apparatus, a record-strip, rollers over which said strip extends, vibrating reeds having their ends arranged adjacent to said strip, an electric circuit in which said reeds are arranged, and a vibrator, controlled by the device to be weighed, for closing said electric circuit, whereby a spark from a reed engaging with the record-strip will burn a perforation through said strip, substantially as specified.

EDWARD McGARVEY.

Witnesses:
JAMES VALLANCE,
H. H. HARSHBERGER.